US011651695B2

(12) United States Patent
Lax et al.

(10) Patent No.: US 11,651,695 B2
(45) Date of Patent: May 16, 2023

(54) ENGINE LOAD MODEL SYSTEMS AND METHODS

(71) Applicant: GE Aviation Systems, LLC, Grand Rapids, MI (US)

(72) Inventors: David Michael Lax, Grand Rapids, MI (US); Mark Darnell, Grand Rapids, MI (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 82 days.

(21) Appl. No.: 17/306,805

(22) Filed: May 3, 2021

(65) Prior Publication Data

US 2021/0327284 A1 Oct. 21, 2021

Related U.S. Application Data

(63) Continuation of application No. 15/635,853, filed on Jun. 28, 2017, now abandoned.

(51) Int. Cl.
*G08G 5/00* (2006.01)
*G01C 21/20* (2006.01)
(Continued)

(52) U.S. Cl.
CPC ............. *G08G 5/003* (2013.01); *B64D 27/02* (2013.01); *B64D 31/00* (2013.01); *G01C 21/20* (2013.01);
(Continued)

(58) Field of Classification Search
CPC .... G08G 5/003; G08G 5/0021; G08G 5/0034; G08G 5/0091; B64D 27/02; B64D 31/00; G01C 21/20; G01C 21/00; G06Q 40/12
See application file for complete search history.

(56) References Cited

U.S. PATENT DOCUMENTS 4,827,417 A    5/1989   Berger et al.
4,947,334 A *   8/1990   Massey ................ G05D 1/0669
                                                                          701/4
(Continued)

OTHER PUBLICATIONS

Extended European Search Report for European Application No. 18179923.0 dated Dec. 4, 2018, 8 pages.

*Primary Examiner* — Rami Khatib
(74) *Attorney, Agent, or Firm* — Wood IP LLC

(57) ABSTRACT

Methods, apparatus, and articles of manufacture to provide improved engine load models are disclosed. An example apparatus includes a model generator to generate an engine load model for an engine using flight information, weather information, and manifest information to predict a load on the engine from an engine subsystem utilization modeled for a flight. The example model generator is to incorporate the engine load model into an engine model, the engine model representing engine behavior for the flight. The example model generator is to determine a first measure of thrust from the engine and a second measure of fuel flow to the engine using the engine model with the engine load model, the engine load model to modify engine behavior by the predicted load on the engine from the engine subsystem utilization. The example model generator is to generate flight parameters for a flight path using the first measure of thrust and the second measure of fuel flow for the predicted load on the engine based on the engine load model.

23 Claims, 13 Drawing Sheets

(51) Int. Cl.
    *B64D 31/00*         (2006.01)
    *G06Q 40/00*         (2012.01)
    *B64D 27/02*         (2006.01)
    *G06Q 40/12*         (2023.01)

(52) U.S. Cl.
    CPC ........... *G06Q 40/12* (2013.12); *G08G 5/0021* (2013.01); *G08G 5/0034* (2013.01); *G08G 5/0091* (2013.01)

(56) References Cited

U.S. PATENT DOCUMENTS

| | | |
|---|---|---|
| 8,504,175 B2 | 8/2013 | Pekar et al. |
| 8,793,026 B2 | 7/2014 | Boy et al. |
| 9,091,616 B2 | 7/2015 | Moeckly et al. |
| 9,248,914 B2 | 2/2016 | Righi et al. |
| 9,354,621 B2 | 5/2016 | Westervelt et al. |
| 9,355,571 B2 * | 5/2016 | Rucci ................. B62D 1/22 |
| 10,556,703 B1 * | 2/2020 | Skola ................. G08G 5/0065 |
| 2005/0056019 A1 | 3/2005 | Nguyen et al. |
| 2007/0208465 A1 | 9/2007 | Gremmert |
| 2009/0037091 A1 | 2/2009 | Bolt, Jr. et al. |
| 2009/0150012 A1 | 6/2009 | Agam et al. |
| 2009/0298407 A1 * | 12/2009 | Anderson .............. B64D 13/04 701/10 |
| 2011/0153295 A1 * | 6/2011 | Yerramalla ........ G05B 23/0283 701/100 |
| 2011/0178648 A1 | 7/2011 | Calvignac et al. |
| 2011/0208400 A1 | 8/2011 | Lickfold et al. |
| 2012/0245834 A1 | 9/2012 | Klooster et al. |
| 2012/0315602 A1 | 12/2012 | Tenning et al. |
| 2013/0211691 A1 | 8/2013 | Evra et al. |
| 2014/0018980 A1 | 1/2014 | Bollapragada et al. |
| 2015/0267619 A1 * | 9/2015 | Khalid ................. B64C 11/305 701/100 |
| 2015/0279218 A1 | 10/2015 | Irrgang et al. |
| 2015/0369076 A1 | 12/2015 | McCaffrey et al. |
| 2016/0019795 A1 | 1/2016 | Chircop et al. |
| 2016/0236790 A1 * | 8/2016 | Knapp ................. B64D 27/24 |
| 2017/0121011 A1 | 5/2017 | Lax |
| 2018/0268722 A1 | 9/2018 | Meier et al. |

\* cited by examiner

ENGINE LOAD MODEL SYSTEMS AND METHODS

FIELD OF THE DISCLOSURE

This disclosure relates generally to turbine engines and, more particularly, to methods and apparatus to improved engine load model systems and methods.

BACKGROUND

Aircraft can be equipped with a flight management system (FMS) for managing aircraft flight control, generating flight profile data, and providing navigational information such as flight paths designated by waypoints that are represented by navigational location coordinates. Additionally, flight management and thrust management control systems are also configurable to provide aircraft engine throttle settings for manual or automatic control of engine thrust.

The FMS computes cost-optimal controls that determine a flight trajectory of the airplane. The FMS controls and predicts a lateral and vertical profile of the aircraft, including aircraft speeds along the profile, according to an airline flight plan and other constraints such as altitude and speed restrictions and Cost Index (CI), which is a ratio of time cost to fuel cost. The FMS uses the current aircraft and atmospheric state along with all crew-entered or Airline Operations Center (AOC) up-linked data to generate the controls and predict the state trajectory. Using various sensors to determine the exact position of the aircraft, the FMS guides the aircraft along the trajectory through a Flight Control System (FCS). For example, the FMS computes thrust and airspeed to climb to a desired cruise altitude and airspeed, and descend at a computed thrust and airspeed to a destination. Typically, these operations are performed according to programmed schedules and constrained by instrument flight procedures and air traffic control directives.

BRIEF DESCRIPTION OF THE DRAWINGS

Certain examples are depicted in the drawings and described in the accompanying description. Wherever possible, the same reference numbers will be used throughout the drawing(s) and accompanying written description to refer to the same or like parts.

BRIEF SUMMARY

Figure 1:
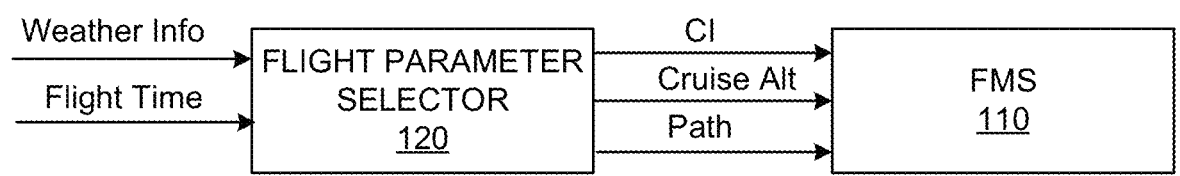
FIG. 1 illustrates an example flight management decision support system.

Methods, apparatus, and articles of manufacture to provide improved engine load models to compute improved flight controls are disclosed.

Certain examples provide an apparatus including a processor and a memory. The example processor includes a model generator to generate an engine load model for an engine using flight information, weather information, and manifest information to predict a load on the engine from an engine subsystem utilization modeled for a flight. The example model generator is to incorporate the engine load model into an engine model, the engine model representing engine behavior for the flight. The example model generator is to determine a first measure of thrust from the engine and a second measure of fuel flow to the engine using the engine model with the engine load model, the engine load model to modify engine behavior by the predicted load on the engine from the engine subsystem utilization. The example model generator is to generate flight parameters for a flight path using the first measure of thrust and the second measure of fuel flow for the predicted load on the engine based on the engine load model.

Certain examples provide a tangible computer-readable storage medium comprising instructions which, when executed, cause a machine to implement at least a model generator. The example model generator is configured to generate an engine load model for an engine using flight information, weather information, and manifest information to predict a load on the engine from an engine subsystem utilization modeled for a flight. The example model generator is configured to incorporate the engine load model into an engine model, the engine model representing engine behavior for the flight. The example model generator is configured to determine a first measure of thrust from the engine and a second measure of fuel flow to the engine using the engine model with the engine load model, the engine load model to modify engine behavior by the predicted load on the engine from the engine subsystem utilization. The example model generator is configured to generate flight parameters for a flight path using the first measure of thrust and the second measure of fuel flow for the predicted load on the engine based on the engine load model.

Certain examples provide a method including generating, using a processor, an engine load model for an engine using flight information, weather information, and manifest information to predict a load on the engine from an engine subsystem utilization modeled for a flight. The example method includes incorporating, using the processor, the engine load model into an engine model, the engine model representing engine behavior for the flight. The example method includes determining, using the processor, a first measure of thrust from the engine and a second measure of fuel flow to the engine using the engine model with the engine load model, the engine load model to modify engine behavior by the predicted load on the engine from the engine subsystem utilization. The example method includes generating, using the processor, flight parameters for a flight path using the first measure of thrust and the second measure of fuel flow for the predicted load on the engine based on the engine load model.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe an exemplary implementation and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As used herein, the terms "system," "unit," "module," "engine," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, engine, or system may include a hard-wired device that performs operations based on hard-wired logic of the device. Various modules, units, engines, and/or systems shown in the attached figures may represent the hardware that operates based on software or hardwired instructions, the software that directs hardware to perform the operations, or a combination thereof.

As used herein, an engine can also be referred to as a combustion engine, a turbine engine, a combustion turbine, or a gas turbine. Turbine engines are commonly utilized in aircraft and power-generation applications. As used herein, the terms "aircraft turbine engine," "gas turbine," "land-based turbine engine," and "turbine engine" are used interchangeably.

In some examples, the engine and/or a load put on the engine can be modeled. The model can simulate the components, configuration, operation, degradation, etc., of the engine at an instant, in the past, in the future, and/or over time. For example, a model of a turbine engine can form a digital twin of the turbine engine, allowing simulation, viewing, and other modeling of the components of the turbine engine and their behavior under different environmental condition, configuration, and/or stimuli. For example, the controller can use a look-up table model, a curve-fit (regression) model, and/or a physics-based model (e.g., an aero-thermodynamic model). The model characterizes the turbine engine by estimating outputs based on inputs. For example, the model inputs can include actuator positions. In another example, the model inputs can include ambient conditions based on an altitude, a Mach number, and a day temperature of the turbine engine. The model outputs can include processed sensor data (e.g., estimates of sensor data based on unfiltered and/or unprocessed sensor data), performance parameters such as thrust and stall margins, etc.

In some examples, an engine load can be modeled based on operating conditions, environmental conditions, flight plan, etc. Flight trajectory, weather forecast, manifest information (e.g., passenger information, cargo information, etc.), etc., can be used to model an engine load for a flight.

As used herein, an engine load is defined as a mechanical load (e.g., transferred via a gearbox box, etc.) and pneumatic (e.g., air bled from the engine and/or gas path, etc., also referred to as bleed air). For example, an aircraft gear box operates electrical motors and hydraulic pumps (e.g., corresponding to electrical and hydraulic power generation systems, respectively). Electrical systems can be used to power lights, outlets, aircraft control systems, etc. Hydraulic pumps can be used to activate flight (e.g., wing, etc.) controls, etc. Pneumatic systems can be used to bleed air to operate an environmental control system, de-ice system, anti-ice system, etc. An engine load model models and/or otherwise represents the parameters, constraints, effects, etc., of the mechanical load (e.g., including electrical and hydraulic loads) and pneumatic or "bleed air" load on the engine.

Optimization and/or other improvement methods allow for improvement in reducing or minimizing flight cost over traditional table-based methods. In some examples, speeds and altitudes are computed to reduce or minimize direct operating cost. However, many simplifying assumptions are applied to enable a more practical design for legacy computing systems. In certain examples disclosed herein, improvement/optimization methods and associated systems utilize not only a nominal aircraft/engine model but also augment these model(s) with model(s) of engine load to characterize vehicle performance. By augmenting a model of the engine with a model of the engine load, an improved control solution can be provided for a specific flight under specific operating loads.

Certain examples augment an optimization/improvement algorithm with a more advanced vehicle model that accounts for engine load(s) over the course of a flight. For example, aerodynamic and engine models can be used to determine the dynamic behavior of an air vehicle, which is utilized in an improvement/optimization routine to determine flight controls (e.g., altitude, speed, etc.) that reduce or minimize fuel and time costs. In certain examples, a secondary 'engine load' model is employed to augment the engine model with the effects of mechanical (e.g., electrical, hydraulic, etc.) and/or pneumatic loads on the engine. These loads combine to affect engine thrust, fuel usage, and, therefore, an overall cost to operate the aircraft.

A more accurate model of engine loads uses inputs of flight trajectory, weather forecast, passenger and/or cargo payload, historical information, etc., to predict engine subsystem utilization (e.g., load and bleed settings, etc.) for an upcoming flight. For example, a fully loaded aircraft operating in summer months may use more energy to run the air conditioning system compared to a cargo aircraft in the winter. Similarly, an icing forecast in cruise can result in anti-ice system activation, which involves more engine bleed air. The engine load model can also consider current conditions as the aircraft traverses the flight plan to refine forecasted conditions. Outputs of the predictive loads model are fed into the engine model to determine accurate measures of thrust and fuel flow used in the optimization process to minimize or otherwise reduce an overall cost of a flight.

Flight management systems (FMS) can be used to determine a cruise altitude and constant climb, cruise, and descent speeds that minimize or reduce Direct Operating Cost (DOC) for a prescribed takeoff weight and mission range and assuming maximum thrust for climb and idle thrust for descent. An admissible control is constrained by performance limits and airspace restrictions, for example. Software look-up tables derived from flight trials and/or simulation can define altitudes and speeds, for example.

On some high-performance airplanes, an improvement/optimization method is derived from a calculus of variations. For example, variable climb, cruise, and descent speeds to achieve more optimal/improved performance relative to a constant speed method. However, many simplifying assumptions are applied to enable a practical design.

One element of the aircraft/engine model that is otherwise unaccounted for in the optimization/improvement process is variable loads on the engine. By anticipating and modeling expected loads over the course of a flight, the optimization/improvement can account for these effects and determine a more optimal flight profile, for example.

In addition, the more accurate thrust and fuel flow produced in this approach allow for a more accurate predicted state trajectory. The more accurate predicted state trajectory provides a better estimate of fuel used throughout a flight, time of arrival, and other information important to aircraft traffic management. An air traffic management system can indirectly benefit from the more accurate state trajectory through improved predictive capability enabling tighter spacing between aircraft and other operational considerations.

Thus, certain examples allow for predictive modeling by accounting for probable future conditions and arriving at a more optimal solution than an approach that assumes nominal engine conditions. Using secondary or engine subsystems (e.g., electrical subsystem, hydraulic subsystem, pneumatic subsystem, etc.) at certain times and/or locations in a flight facilitates more integrated improvement/optimization with a low-cost impact while synergizing engine operations (e.g., engine subsystem utilization) with flight plan improvement/optimization, for example.

In certain examples, engine bleeds can have a significant effect on fuel usage. In practice, for airspeed improvement/optimization, most bleeds do not influence the optimal operating point for high bypass-ratio turbine engines (only how much fuel is used at that operating point). However, for more advanced operating condition optimization and/or improvement (e.g., optimal throttle setting, optimal control surface usage, etc.), these engine bleed effects can be very important.

In certain examples, a predictive model can be data driven from historical flights on the same route. The predictive model can blend current operating conditions with a forecast for future conditions. The predictive model can be replaced with a physics based simulation of how the engine subsystems (e.g., electrical, hydraulic, pneumatic, etc.) would operate. The predictive model can employ heuristic and or probabilistic rules about engine subsystem utilization, or derive a nominal model.

In some examples, a controller such as an engine control unit (ECU), an electronic engine control (EEC) unit, a full-authority digital engine control (FADEC) unit, etc., can utilize a model that simulates an engine and/or associated engine load. For example, a model of a turbine engine can form a digital twin of the turbine engine, allowing simulation, viewing, and other modeling of the components of the turbine engine and their behavior under different environmental configuration and stimuli. For example, the controller can use a look-up table model, a curve-fit (regression) model, and/or a physics-based model (e.g., an aero-thermodynamic model). The model characterizes the turbine engine by estimating outputs based on inputs. For example, the model inputs can include throttle position and the state of air entering an engine inlet. In another example, the model inputs can include ambient conditions based on an altitude, a Mach number, and a day temperature of the turbine engine.

The model outputs can include processed sensor data (e.g., estimates of sensor data based on unfiltered and/or unprocessed sensor data, etc.), performance parameters such as thrust and stall margins, etc.

In certain examples, using weather forecast information, a cost index (CI), cruise altitude and/or lateral route to be used by the FMS is selected to reduce and/or minimize flight cost including accounting for fuel and time factors. In certain examples, the CI (for the FMS), cruise altitude and/or lateral route may be selected for different portions of a flight. In some examples, changes to one or more of these parameters is based on weather conditions (e.g., predicted or forecasted wind and temperature, etc.) at different locations along a flight path.

For example, as shown in FIG. 1, a decision support system 100 can be provided to select parameters for a FMS 110, which can be fixed or changed dynamically during a flight. The FMS 110 receives initial and optionally updated parameter information from a flight parameter selector 120. In various examples, as described in more detail herein, weather information and/or flight time information (e.g., departure time, current time, and/or estimated arrival time, etc.) are received by the flight parameter selector 120, which outputs control parameters to the FMS 110. For example, a CI value, cruise altitude and/or lateral flight path may be set or updated using the flight parameter selector 120. The flight parameter selector 120 can be implemented in hardware, software or a combination thereof.

Figure 2:
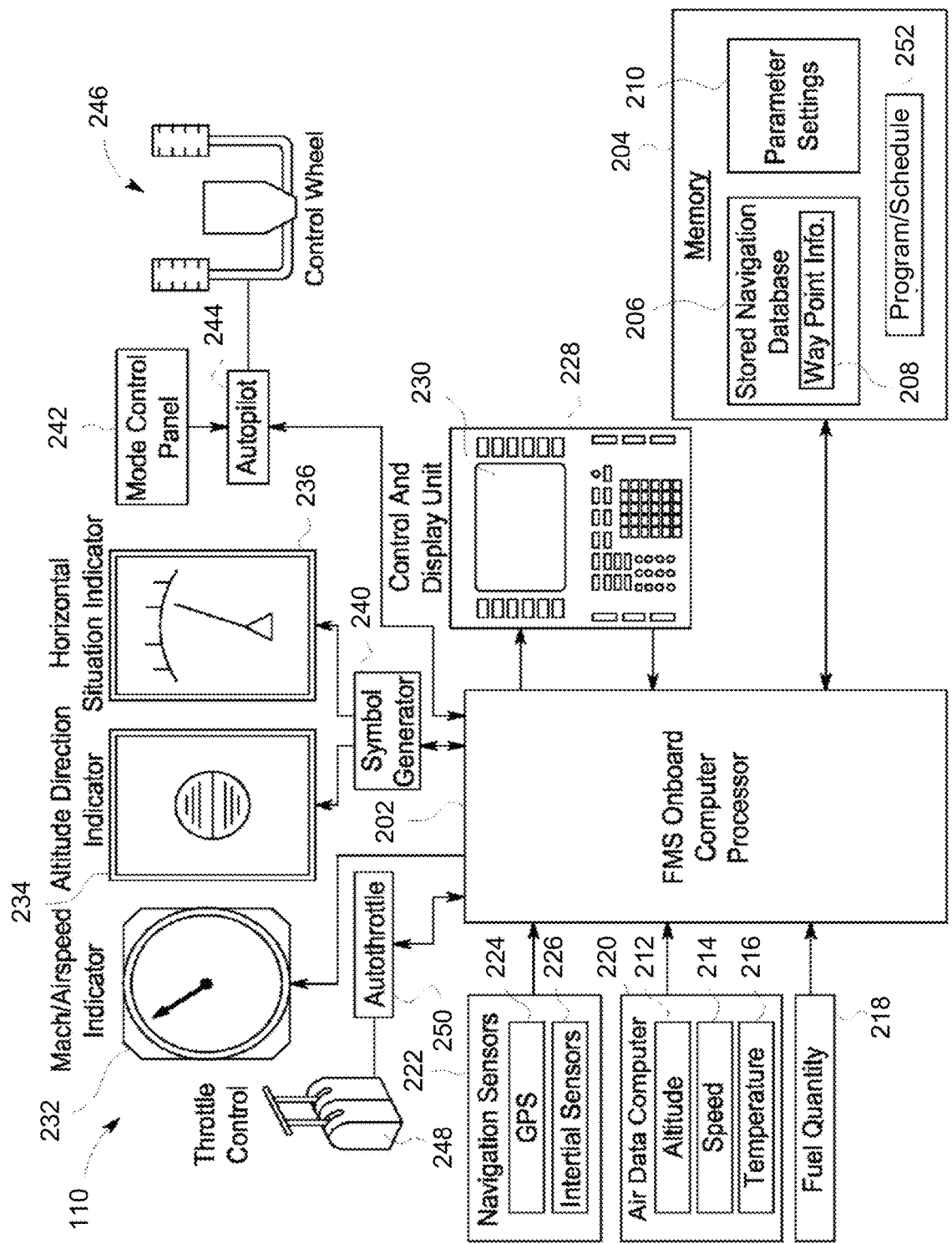
FIG. 2 illustrates an example flight management system.

FIG. 2 illustrates an example FMS 110 that can receive selected flight parameters to control engine operation and/or other aircraft flight. In the illustrated example, the FMS 110 includes an FMS onboard computer processor 202 and a memory 204. The memory 204 includes a stored navigation database 206 that stores aircraft navigation information including determined waypoint information 208, which may be points along the flight plan where one or more of the CI, lateral and vertical profiles for a flight of the aircraft is changed. Thus, the memory 204 can include navigational waypoints and corresponding aircraft control parameters 210 to be changed by the FMS onboard computer processor 202 during flight, such as using the flight parameter selector 120 of the example of FIG. 1.

The onboard computer processor 202 receives various input including sensed aircraft altitude 212, sensed aircraft speed 214, and sensed air temperature 216 from an air data computer 220. Additionally, the processor 202 receives input from navigation sensors 222, such as location coordinates from a global positioning system (GPS) 224 and inertial data from inertial sensors 226. Further, the processor 202 receives other input from other sensors such as fuel quantity 218, etc. The processor 202 can receive and/or generate one or more models of the aircraft, engine, etc., which can be used to generate flight plan, trajectory, engine settings, and/or other parameter information used by the processor 202 and/or stored in the memory 204 (e.g., parameter settings 210, program/schedule 252, etc.).

The onboard computer processor 202 is further shown in communication with a control and display unit (CDU) 228 including a display 230. For example, output data indicating the computed engine thrust may be provided in display pages presented on display 230 to allow a pilot of the aircraft to operate the aircraft pursuant to the output data provided by the flight management system 110.

The FMS 110 is further shown having a Mach/airspeed indicator 232, an altitude direction indicator 234, and a horizontal situation indicator 236. A symbol generator 240 is coupled between the processor 202 and each of the indicators 234 and 236. The FMS 110 also includes a mode control panel 242 providing an output to an autopilot 244, which is also in communication with the processor 202. The autopilot 244 may be part of a flight control system and may operate a control wheel 246 in an automatic piloting mode.

The FMS 110 is further shown including a throttle control 248 for controlling the engine throttle. The throttle control 248 can be manually actuated by a pilot of the aircraft in a manual mode. In an automatic flight control mode, the throttle control 248 may be automatically controlled by an auto throttle signal 250 provided by the processor 202. It should be appreciated that the processor 202 can output command signals for controlling the aircraft with the computed throttle value by providing output commands via the display 230 or by automatically controlling the throttle control 248 via the auto throttle signal 250.

The FMS 110 shown and described herein is one example of a flight management system that may be configured to control an aircraft during aircraft departure, cruising and arrival procedures. It should be appreciated that the memory 204 and the stored navigation database 206 can include a navigation database in a flight management system that is upgraded to perform a climb schedule and/or other flight path/plan 252.

Figure 3:
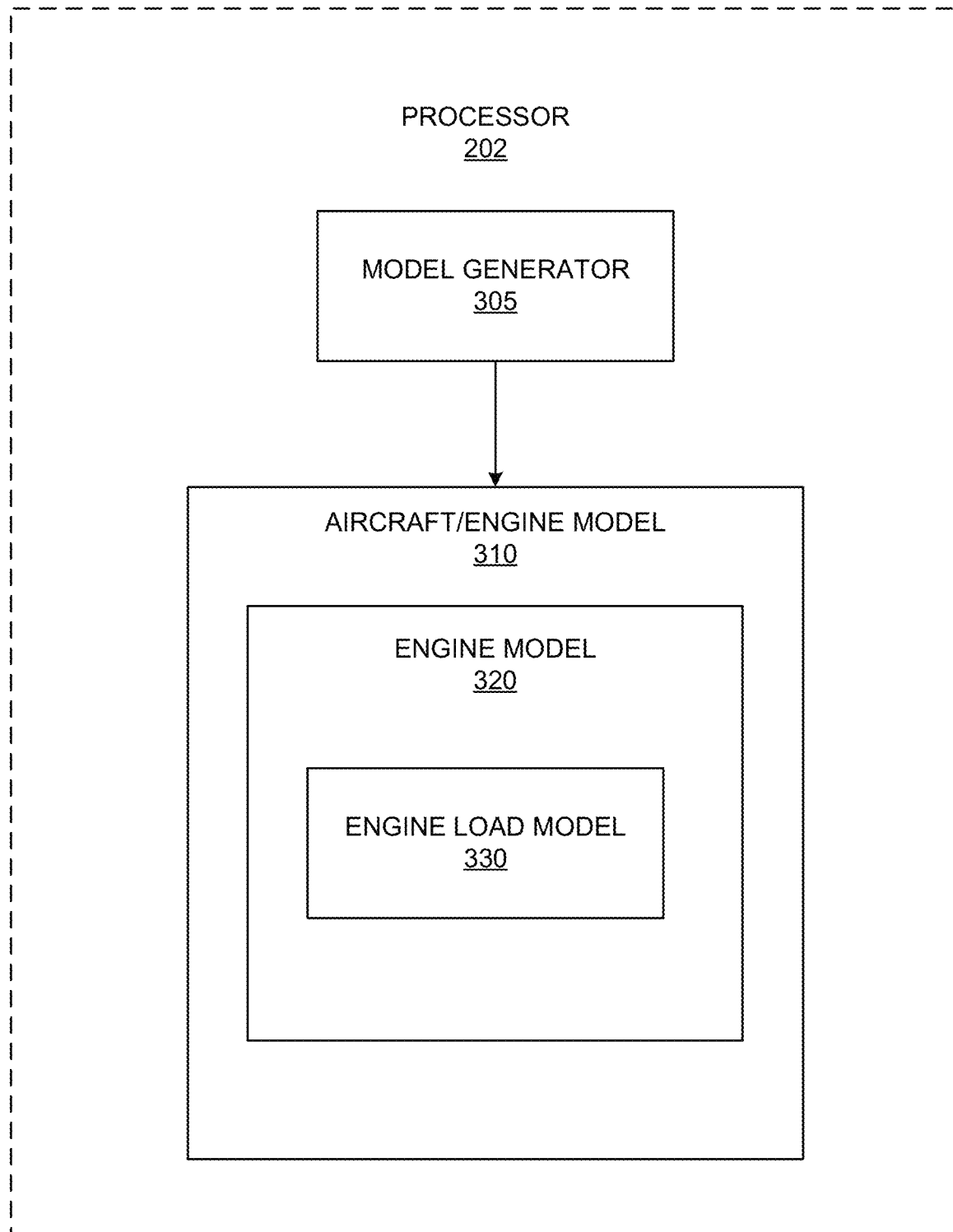
FIG. 3 illustrates an augmented aircraft/engine model to characterize vehicle performance and facilitate a control solution for a specific flight under specific operating load(s).

FIG. 3 illustrates a model generator 305 of the processor 202 to generate an augmented aircraft/engine model 310 used by the processor 202 to characterize vehicle performance and facilitate a control solution for a specific flight under specific operating load(s). The example augmented model 310 includes an engine model 320 which includes an engine load model 330. The engine model 320 can serve as a representation, digital twin, etc., of the engine (e.g., a gas turbine engine, etc.) through which engine operation, degradation, lifecycle, etc., can be modeled. The engine load model 330 provides a finer grain of detail regarding one or more loads experienced by the engine during operation. Thus, the high-level aircraft/engine model 310 can be used to model overall behavior such as flight path, overall system usage, etc. The engine model 320 provides a finer grain of detail regarding engine operation, wear on engine parts, and overall engine performance during a flight. The engine load model 330 provides lower level detail and modeling regarding particular engine system loads due to demands on engine subsystems such as mechanical and pneumatic loads including electrical load, hydraulic load, pneumatic load, etc.

In certain examples, the models 310, 320 can be used to determine flight parameters such as cruise altitude and constant climb, cruise, and descent speeds that reduce DOC for a prescribed takeoff weight and mission range assuming maximum thrust for climb and idle thrust for descent. Certain examples determine variable climb, cruise, and descent speeds to achieve more optimal performance compared to determines that assume a constant speed. Such determinations can be improved using the engine load model 330.

Figure 4:
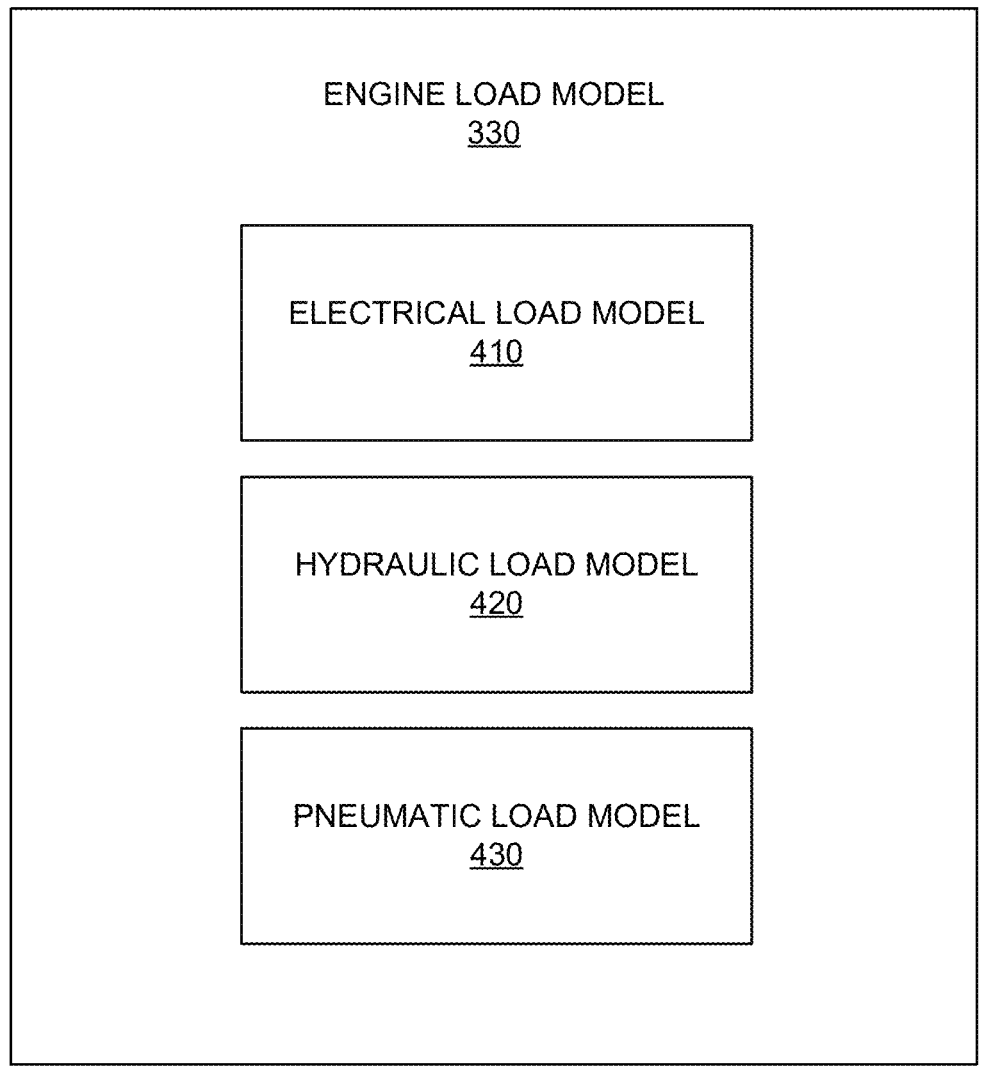
FIG. 4 shows an example implementation of an engine load model.

FIG. 4 shows an example implementation of the engine load model 330. The example engine load model 330 of FIG. 4 includes an electrical load model 410, a hydraulic load model 420, and a pneumatic or air load model 430. In certain examples, two types of loads on the engine include: 1) bleed air and 2) mechanical power. Bleeding air involves opening a pneumatic valve to bleed high pressure air off the engine to operate environmental controls to maintain pressure and temperature in an aircraft cabin, provide hot air on an aircraft wing for de-icing, etc. Such pneumatic load affects engine efficiency and engine load, for example. Mechanical power involves a takeoff transfer of energy from turbine to other aircraft systems such as electrical power distribution and hydraulic power (e.g., primary flight control, etc.)). Thus, in certain examples, the bleed air and mechanical systems can be modeled as the electrical load model 410, the hydraulic load model 420, and the pneumatic load model 430, collectively referred to as the engine load model 330.

For example, the electrical load model 410 models and/or otherwise represents generation and transfer of electrical energy from the engine to one or more aircraft systems, such as flight controls (e.g., cockpit controls, etc.), environmental controls (e.g., heating, cooling, etc.), lighting, communications (e.g., intercom, transponder, cockpit communications, etc.), power outlets (e.g., for laptops, galley equipment, etc.), etc. Thus, electrical power distribution from the engine to vehicle systems can be modeled in the electrical load model 410. The example hydraulic load model 420 models and/or otherwise represents operation of hydraulic systems powered by and/or otherwise influenced by the engine such as flaps, landing gear, brakes, flight control surfaces, etc. The example pneumatic load model 430 models and/or otherwise represents systems that bleed air off the engine for aircraft systems such as bleeding high pressure air off the engine to operate environment controls to maintain pressure and temperature in an aircraft cabin, bleeding air from the engine to the wing for de-icing, routing air from the engine to a hydraulic component, etc.

In certain examples, assumptions and/or predictions regarding environment conditions (e.g., cabin heat), flight control system, electrical power system(s), etc., can be used for a given day to predict and/or otherwise forecast what engine load(s) will be. If engine load predictions are incorrect, then engine operation is not optimal. By better predicting what engine load(s) will be (e.g., based on cold day, hot day, time of season, state of atmosphere, time of day, etc.), engine modeling can be more accurate and flight parameter (e.g., flight path, cruising altitude, rate of ascent, rate of descent, etc.) can be better determined. For example, whether it is morning, whether the flight includes business people on laptops drawing power from the cabin, whether the flight is bumpy and involves much stabilizing activity, etc., affect engine loads that can be modeled to improve engine/flight performance.

Thus, one or more models of the engine loads can be added into a prediction of conditions and associated parameters for an engine/aircraft flight. That model can be driven by big data (e.g., historical data, etc.), simulation (e.g., simulating that particular flight on that particular day based on known conditions to extract engine load parameters, etc.), etc. The engine load(s) model is added to engine flight schedule calculations to improve the accuracy and optimization of the engine configuration calculation. One or more secondary engine load models 330 are employed to augment the engine model 320 with effects of electrical, hydraulic, and/or pneumatic loads on the engine. These loads combine to affect engine thrust, fuel usage, etc., and, therefore, impact the overall cost to operate the aircraft. By anticipating and modelling the expected engine loads over the course of a flight, an optimization/improvement can account for the engine load effects and determine a more optimal flight profile.

In addition, a more accurate thrust and fuel flow produced using engine load model(s) 330 with the engine model 320 allow for a more accurate predicted state trajectory. A more accurate predicated state trajectory provides a better estimate of fuel used throughout a flight, time of arrival, and/or other information important to aircraft traffic management. An air traffic management system can benefit from the more accurate state trajectory through improved predictive capability, which enables tighter spacing between aircraft and other operational considerations, for example.

Figure 5:
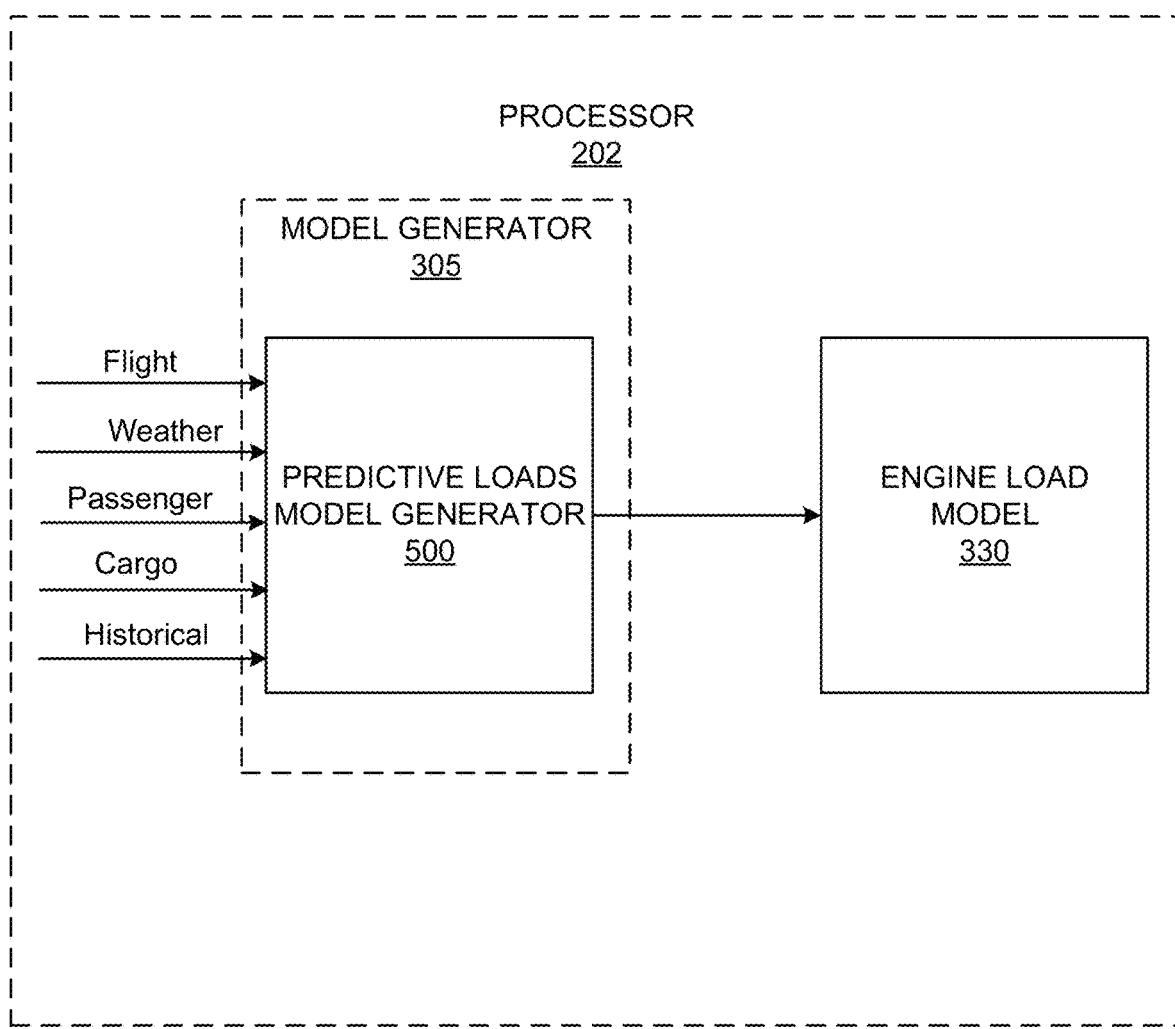
FIG. 5 illustrates an example predictive loads model generator to generate an engine loads model.

FIG. 5 illustrates an example predictive loads model generator 500 of the example model generator 305 used by the processor 202 to generate the engine loads model 330. The generator 500 receives and processes a plurality of inputs to generate one or more engine load models 330. For example, a model of engine loads takes inputs of flight trajectory, weather forecast, passenger and cargo payload, and historical information to predict engine subsystem (e.g., electrical 410, hydraulic 420, pneumatic 430, etc.) utilization (e.g., load and bleed settings, etc.) for an upcoming flight. For example, a fully loaded aircraft operating in summer months uses more energy to run its air conditioning system compared to a cargo aircraft operating in winter. Similarly, a forecast calling for ice is likely to result in activation of an aircraft's anti-ice system which involves more engine bleed than normal operation. Generating the engine load(s) model 330 can also take into account current conditions as an aircraft traverses its flight plan to refine upcoming estimated conditions. That is, the generator 500 can be dynamic to adjust the engine load model 330 determination on-the-fly.

The outputs of the predictive loads model 330 (e.g., the electrical load model 410, hydraulic load model 420, pneumatic load model 430) are fed into the engine model 320 to determine more accurate measures of thrust and fuel flow used in an improvement/optimization process to minimize or otherwise reduce an overall cost of an aircraft flight. Providing the engine loads model 330 (e.g., electrical 410, hydraulic 420, and/or pneumatic 430, etc.) provides predictive modelling that accounts for probable future conditions and generation of a more optimal solution than an approach that just assumes nominal engine conditions. Generating and applying the engine load model 330 facilitates a more integrated improvement/optimization that models engine subsystem utilization (e.g., electrical, hydraulic, pneumatic, etc.) at certain times and/or locations in a flight to provide a lower/lowest cost impact. Using the engine load model 330 with the engine model 320 synergizes engine operations with flight plan optimization.

Thus, using components of the engine load model 330 to better inform the engine model 320 and the overall aircraft/engine model 310 provides knowledge of load on the engine and corresponding fuel flow to the engine, which is unavailable to the models 310, 320 without the further engine load modelling of the model 330. While weight, environmental, and other operating conditions change over time, the models 310-330 allow the system 110 to predict apriori aircraft and/or engine behaviors under certain conditions. Instead of reacting, the FMS 110 can be proactive based on the models 310-330 to generate an up-front estimate of engine and/or other aircraft occurrences for a given condition or set of conditions, which can then be applied to the engine(s) when the aircraft experiences such condition(s).

The FMS 110 computes control parameters and predicts a vehicle trajectory using the models 310-330 of the vehicle. The control parameters and trajectory can be more accurately predicted because the models 310-330 provide more and better information regarding how the weight of the vehicle is changing, how much fuel is being burned, how environmental conditions are impacting operation, etc.

While example implementations of the decision support system 100 and associated flight management system 110 are illustrated in FIGS. 1-5, one or more of the elements, processes and/or devices illustrated in FIG. 1-5 can be combined, divided, re-arranged, omitted, eliminated, and/or implemented in any other way. Further, the example FMS 110, parameter selector 120, processor 202, memory 204, etc., and/or, more generally, the example decision support system 100 of FIGS. 1-5 can be implemented by hardware, software, firmware, and/or any combination of hardware, software, and/or firmware. Thus, for example, any of the example FMS 110, parameter selector 120, processor 202, memory 204, etc., and/or, more generally, the example decision support system 100 of FIGS. 1-5 can be implemented by one or more analog or digital circuit(s), logic circuits, programmable processor(s), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example FMS 110, parameter selector 120, processor 202, memory 204, etc., and/or, more generally, the example decision support system 100 of FIGS. 1-5 is/are hereby expressly defined to include a tangible computer readable storage device or storage disk such as a memory, a digital versatile disk (DVD), a compact disk (CD), a Blu-ray disk, etc., storing the software and/or firmware. Further still, the example system 100 of FIGS. 1-5 can include one or more elements, processes, and/or devices in addition to, or instead of, those illustrated in FIGS. 1-5, and/or may include more than one of any or all of the illustrated elements, processes, and devices.

Flowcharts representative of example methods for implementing the example system 100, FMS 110, parameter selector 120, etc., of FIGS. 1-5 are shown in FIGS. 6-9. In these examples, the methods may be implemented using machine-readable instructions that comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 6-9, many other methods of implementing the example system 100 can alternatively be used. For example, the order of execution of the blocks may be changed, and/or some of the blocks described may be changed, eliminated, or combined.

As mentioned above, the example methods of FIGS. 6-9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM), and/or any other storage device or storage disk in which information is stored for any duration (e.g., for extended time periods, permanently, for brief instances, for temporarily buffering, and/or for caching of the information). As used herein, the term tangible computer-readable storage medium is expressly defined to include any type of computer-readable storage device and/or storage disk and to exclude propagating signals and to exclude transmission media. As used herein, "tangible computer-readable storage medium" and "tangible machine-readable storage medium" are used interchangeably. Additionally or alternatively, the example methods of FIGS. 6-9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

Figure 6:
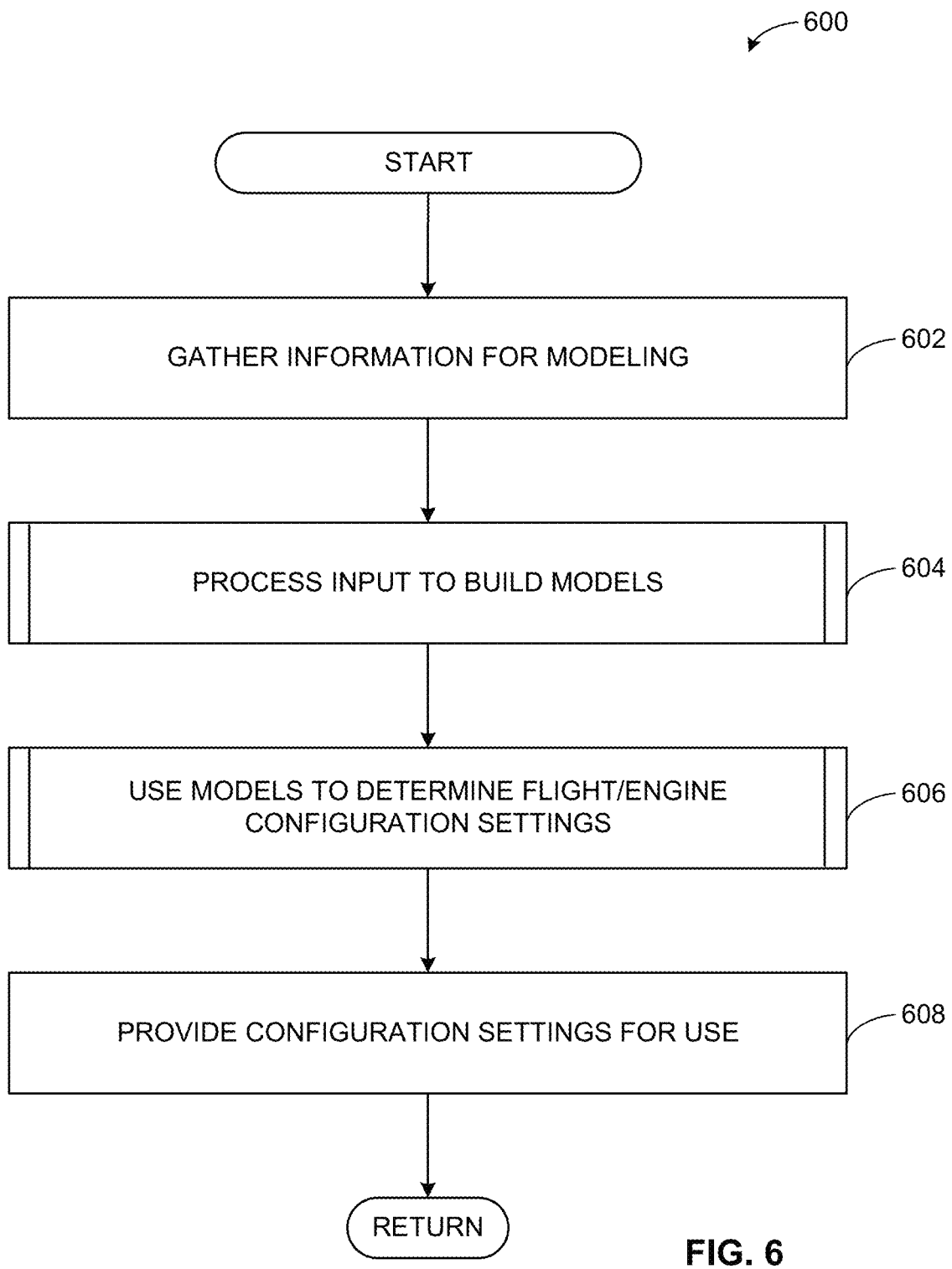
FIGS. 6-9 are flowcharts representative of example methods that can be executed to model engine and associated system structure and behavior to generate control parameters and flight information using the example system of FIGS. 1-5.

FIG. 6 is a flowchart representative of an example method that can be performed by the example decision support system 100 of FIGS. 1-5 to model aircraft, engine, and engine load to determine flight parameters. The example method begins at block 602, at which information is gathered for modeling. For example, as shown in FIGS. 1 and 5, flight information, weather information, manifest data (e.g., passenger manifest data, cargo manifest data, etc.), historical information, etc., can be input, measured, and/or gathered from memory 204 and/or other system and provided to the flight management system 110, flight parameter selector 120, model generator 305, predictive loads model generator 500, etc.

At block 604, the example model generator 305 processes the input to build models 310-330 of the aircraft/engine 310, engine 320, engine load 330, etc. For example, using aircraft and/or engine schematics, capability and/or other information, historical data, passenger and/or cargo information, departure and destination information, etc., one or more models 310-330 can be formed by the model generator 305 (e.g., including the predictive loads model generator 500, etc.). The model generator 305 takes a relational framework that organizes input relevant to the aircraft 310, engine 320, and/or engine load 330 and configures that framework or model according to the input. The input can be assigned as a parameter value in the framework (e.g., number of passengers=x, weight of cargo=y, departure location=abc, arrival location=xyz, departure time=x:xxam, arrival time=y:yypm, etc.). Alternatively or in addition, input can be combined according to an algorithm to determine a model value. For example, a weather forecast combined with a number of passengers provides an indication of cabin temperature which causes demand on the engine (e.g., a full plane on a hot day will involve more air conditioning in the cabin, a more empty plane on a cold day will involve more heating in the cabin, etc.). As another example, a time of day combined with a number of passengers provides an indication of power consumption which places a demand on the engine (e.g., a full cabin in the morning can correlate to many business travelers plugging in their laptops and drawing power from the engine on the flight, etc.).

At block 606, the generated models 310-330 are used with input parameters to determine settings for the FMS 110 and an associated vehicle travel (e.g., aircraft flight, etc.). For example, as discussed above, the models 310-330 can help to determine engine configuration, estimated engine behavior, predicted engine load, etc., for an upcoming flight of an aircraft under the modeled conditions. Control parameters can be determined, and flight trajectory can be predicted using the model information. Aircraft weight, fuel, cruising altitude, flight path, speed, and/or other configuration can be determined based on the models 310-330. Improved modeling results in improved predictability and improved vehicle performance, for example. Given modeled conditions, the FMS 110 knows more about how the weight of the vehicle will change and how much fuel will be burned, which can translate to a more accurate prediction of vehicle trajectory and improved vehicle control.

For example, energy produced/made available by the engine of an aircraft can be represented as follows:

$$E = T + S + R \quad \text{(Equation 1)},$$

where E represents energy or power produced by the engine, T represents engine power consumed to generate thrust for the aircraft, S represents engine energy used to power on-board systems such as power outlets, lighting, communications, environmental controls, etc., and R represents energy remaining. Rearranging Equation 1 provides:

$$R = E - T - S \quad \text{(Equation 2)},$$

which allows the flight parameter selector 120 and/or the FMS 110 to calculate and/or manage power to operate and/or manage aircraft systems for a given flight. The models 310-330 assist the FMS 110 in determining flight trajectory, cruising altitude, fuel level, flight cost, and/or other pre-flight configuration information, for example.

At block 608, the configuration/settings are provided to and/or otherwise used by the FMS 110. The FMS 110 can apply the models, settings, and/or other configuration information when the vehicle (e.g., the aircraft, etc.) is in transit (e.g., in flight, etc.). For example, applying Equations 1-2 in the engine loads model 330, an estimated engine production value, E, helps the FMS 110 to determine engine throttle settings, etc., to produce the requisite power. Thrust, T, and system power, S, estimates help the FMS 110 configure and maintain aircraft systems during flight. An indication of the remainder, R, helps the FMS 110 determine settings, etc., for a particular engine, aircraft, flight, etc. For example, the FMS 110 and its models 310-330 can determine how much leeway is available to vary parameters/settings based on engine power remaining, R, after accounting for thrust and aircraft systems.

Thus, more accurate models 310-330 including the engine load model 330 improves accuracy in determining flight cost including trajectory and/or other parameters and ability for the FMS 110 to adapt dynamically to changing conditions during flight using the modeled aircraft 310 and engine(s) 320-330. Looking at the engine load model 330, separating engine loads into mechanical (electrical load model 410 and hydraulic load model 420) and bleed air (pneumatic load model 430) allows the FMS 110 to leverage a more complete, detailed engine model 320 and overall aircraft/engine system model 310 including the engine loads modeled in the engine load model 330. Flight cost, time, trajectory, altitude, fuel, capacity, etc., can be more accurately, dynamically, and flexibly determined using the models 310-330 to enable the FMS 110 to react to more variation, scenarios, etc., than would be possible without the engine loads model 330, for example.

By modeling systems drawing energy from an aircraft engine and affecting engine operation, an estimation of warranted thrust as well as other engine demands can be modeled, predicted, and reacted to by the FMS 110. Input such as date, time, location(s), engine thrust and other systems can be modeled 330 to predict/forecast loads and applied to the engine 320 and system 310 models to control flight calculation, trajectory, etc., for smoother, safer, and more efficient flight and associated system operation.

Figure 7:
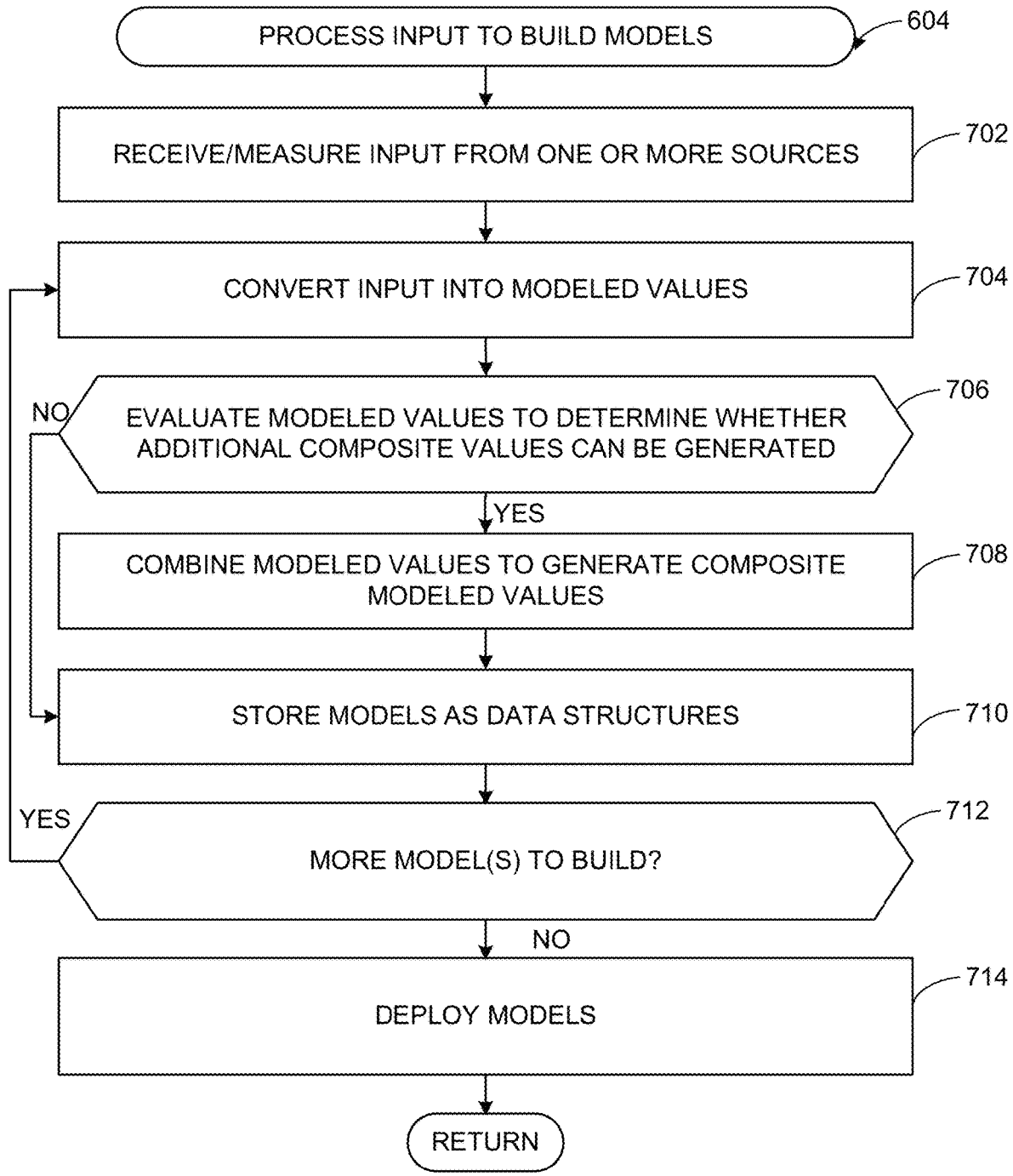

FIG. 7 illustrates an example implementation of processing input to build models 310-330 (block 604 of the example of FIG. 6). At block 702, input is received and/or measured from one or more sources as input to the model(s) 310-330. For example, the model generator 305 processes the input such as aircraft and/or engine schematics, capability and/or other information, historical data, passenger and/or cargo information, departure and destination information, weather forecast, etc.

At block 704, the input is converted into one or more modeled values for incorporation in the model(s) 310-330. For example, the example model generator 305 processes the input to build models 310-330 of the aircraft/engine 310, engine 320, engine load 330, etc. For example, using the input, one or more models 310-330 can be formed by the model generator 305 (e.g., including the predictive loads model generator 500, etc.).

For example, the model generator 305 takes a relational framework that organizes input relevant to the aircraft 310, engine 320, and/or engine load 330 and configures that framework or model according to the input. The input can be assigned as a parameter value in the framework (e.g., number of passengers=x, weight of cargo=y, departure location=abc, arrival location=xyz, departure time=x:xxam, arrival time=y:yypm, etc.).

At block 706, modeled values are evaluated to determine whether additional composite model values can be generated from the modeled values. For example, the modeled values can be evaluated by the model generator 305 to determine whether the values can be used in combination to determine other values. For example, a weather forecast value and a departure time value can be used to calculate a de-icing value, for example. An arrival time, an arrival location, and a weather value can be used to determine an estimated condition value, for example.

If additional composite modeled values can be generated, then, at block 708, modeled values are combined to generate the additional composite modeled values. For example, the modeled values of the input can be combined according to an algorithm to determine a composite model value. For example, a weather forecast combined with a number of passengers provides an indication of cabin temperature which causes demand on the engine (e.g., a full plane on a hot day will involve more air conditioning in the cabin, a more empty plane on a cold day will involve more heating in the cabin, etc.). As another example, a time of day combined with a number of passengers provides an indication of power consumption which places a demand on the engine (e.g., a full cabin in the morning can correlate to many business travelers plugging in their laptops and drawing power from the engine on the flight, etc.).

At block 710, the model 310-330 is stored as a data structure. For example, the aircraft model 310, engine model 320, and/or engine load model 330 can be stored with its modeled values in a relational framework as a data structure in the memory 204 of the processor 202 of the FMS 110. The data structure provides a new construct to store the model(s) 310-330, and lower level model data structures can be nested inside higher-level model data structures. For example, the engine load model 330 is nested as a data structure inside the engine model 320 data structure, which is nested inside the aircraft/engine system model 310 data structure.

At block 712, the process repeats until the models 310-330 are built, nested, and saved. Once the models 310-330 are built, nested, and saved, at block 714, the models 310-330 are deployed.

Figure 8:
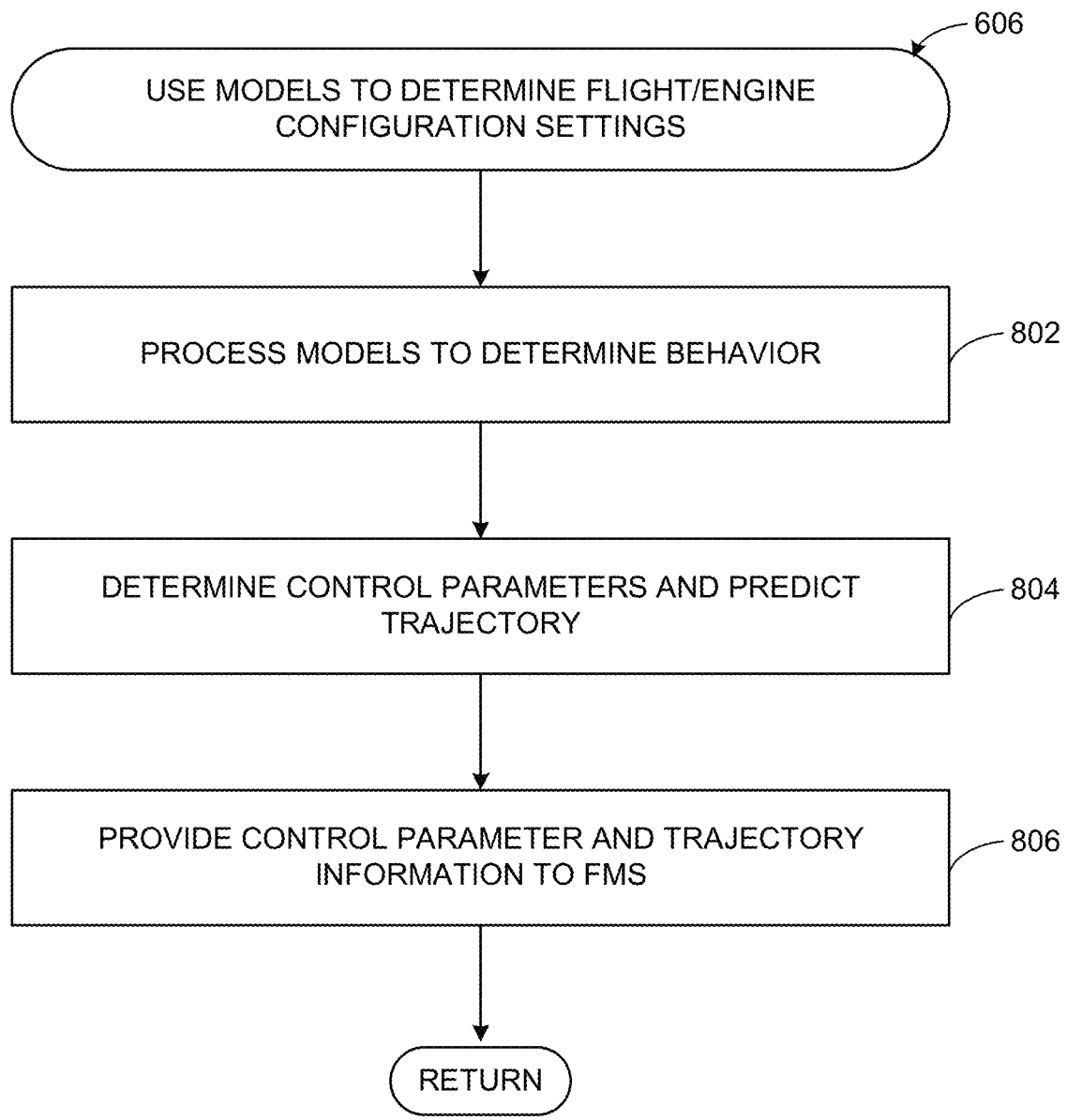

FIG. 8 illustrates an example implementation of using the generated models 310-330 to determine settings for the FMS 110 (block 606 of the example of FIG. 6). At block 802, the model(s) 310-330 are processed to determine behavior. For example, as discussed above, the models 310-330 can help to determine engine configuration, estimated engine behavior, predicted engine load, etc., for an upcoming flight of an aircraft under the modeled conditions.

At block 804, control parameters are determined and flight trajectory can be predicted using the model information. For example, aircraft weight, fuel, cruising altitude, flight path, speed, and/or other configuration can be determined based on the models 310-330. In certain examples, the models 310-330 can be used to simulate engine and/or aircraft behavior under the modeled conditions to predict power consumption/engine load, system settings, flight trajectory, cruising altitude, etc. Improved modeling results in improved predictability and improved vehicle performance, for example. In certain examples, using the electrical load model 410, hydraulic load model 420, and pneumatic load model 430, system-level simulations can be conducted to obtain a more accurate, granular picture and associated prediction for the respective aircraft systems and their effect on engine load and performance. Given modeled conditions, the FMS 110 knows more about how the weight of the vehicle will change and how much fuel will be burned, which can translate to a more accurate prediction of vehicle trajectory and improved vehicle control.

For example, energy produced/made available by the engine of an aircraft and remaining energy available after usage for aircraft thrust and powering aircraft systems can be determined using Equations 1-2 above, which allows the flight parameter selector 120 and/or the FMS 110 to calculate and/or manage power to operate and/or manage aircraft systems for a given flight. The models 310-330 assist the FMS 110 in determining flight trajectory, cruising altitude, fuel level, flight cost, and/or other pre-flight configuration information, for example.

At block 806, the control parameter and trajectory information are provided to the FMS 110. For example, the FMS 110 is provided with the control parameter information including settings, flight trajectory, fuel, altitude, etc., to facilitate flight management for the aircraft and its engine(s).

Thus, certain examples enable monitoring and modeling of engine and aircraft systems and evaluation of corresponding load on the engine(s). Improved modeling through a combination of engine and engine load models provides improved accuracy, adaptivity, and reliability in modeling aircraft systems. Certain examples improve modeling and forecasting of engine and associated system operation given a plurality of random, independent values affecting operation of the engine and associated systems. Certain examples provide engine load modeling to enable proactive, rather than reactive, prediction of engine and associated system behavior to enable the FMS 110 to proactively determine a response to likely conditions, and the response can be applied, adjusted, etc., via the models 310-330 when a condition is encountered during operation.

Figure 9:
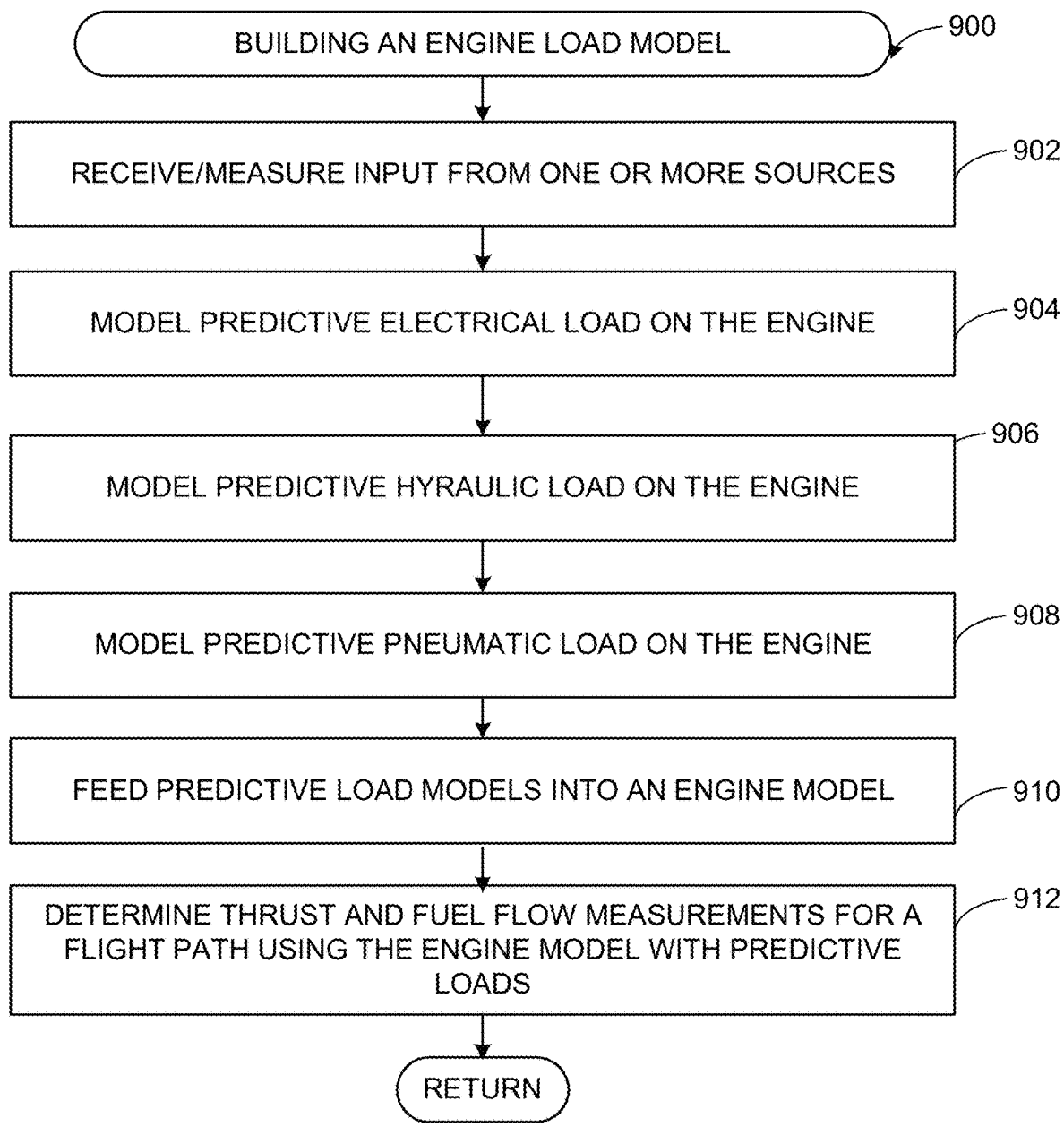

FIG. 9 is a flowchart representative of an example method 900 that can be performed by the example decision support system 100 of FIGS. 1-5 to build an engine load model 330.

FIG. 9 is an example application of the method 600 of FIGS. 6-8 to generate the engine load model 330 as part of the engine model 320, for example. At block 902, input is received and/or measured from one or more sources. For example, the model generator 305 processes the input such as aircraft and/or engine schematics, capability and/or other information, historical data, passenger and/or cargo information, departure and destination information, weather forecast, etc.

At block 904, a predictive electrical load on the engine is modeled 410. For example, the engine load model 330 takes inputs of flight trajectory, weather forecast, passenger and cargo payload, and historical information, etc., to predict engine electrical subsystem utilization (e.g., load settings) for the upcoming flight. For example, a fully loaded aircraft operating in summer months uses more energy to run an air conditioning system compared to a cargo aircraft in the winter. The electrical load model 410 can also take into account current conditions as the aircraft traverses the flight plan to refine the upcoming estimated conditions.

At block 906, a predictive hydraulic load on the engine is modeled 420. For example, the engine load model 330 takes inputs of flight trajectory, weather forecast, passenger and cargo payload, and historical information, etc., to predict engine hydraulic subsystem utilization (e.g., load settings) for the upcoming flight. For example, choppier air involves a different rate of climb and usage of flight controls than takeoff, cruise, and/or landing on a calm day. The hydraulic load model 420 can also take into account current conditions as the aircraft traverses the flight plan to refine the upcoming estimated conditions.

At block 908, a predictive pneumatic load on the engine is modeled 430. For example, the engine load model 330 takes inputs of flight trajectory, weather forecast, passenger and cargo payload, and historical information, etc., to predict engine pneumatic subsystem utilization (e.g., bleed settings) for the upcoming flight. For example, an icing forecast triggers an anti-ice system activation on the aircraft, which involves increased engine air bleed. The pneumatic load model 430 can also take into account current conditions as the aircraft traverses the flight plan to refine the upcoming estimated conditions.

At block 910, the predictive load models 330 (including 410, 420, 430) are feed into an engine model 320. Thus, the engine model 320 including the engine load models 330 provides a more advanced vehicle model that accounts for engines loads over the course of a flight. The engine load models 330 supplement the aerodynamic and engine models 320 used to determine the dynamic behavior of an air vehicle, which is utilized in an optimization routine to determine flight conditions (e.g., altitude and speed, etc.) that reduce or minimize fuel and time costs. Thus, a secondary engine loads model 330 is generated to augment the engine model 320 with the effects of electrical 410, hydraulic 420, and pneumatic 430 loads on the engine. These loads 410, 420, 430 combine to affect engine thrust, fuel usage, etc., and, thus, affect the overall cost to operate the aircraft.

At block 912, the engine model 320 including outputs of the predictive loads model 330 determine more accurate measures of thrust and fuel flow used in the optimization process to reduce or minimize the overall cost of the flight. While the engine loads are unaccounted for in other models, by anticipating and modelling the expected loads over the course of the flight, the optimization can account for these effects and determine a more optimal flight profile, for example. In addition, the more accurate thrust and fuel flow produced in this approach allow for a more accurate pre-dicted state trajectory. The more accurate trajectory produces a better estimate of fuel used throughout a flight, time of arrival, and other information important to aircraft traffic management and engine/aircraft operation. An air traffic management system can benefit from the more accurate state trajectory through improved predictive capability enabling tighter spacing between aircraft and other operational considerations, for example.

Figure 10:
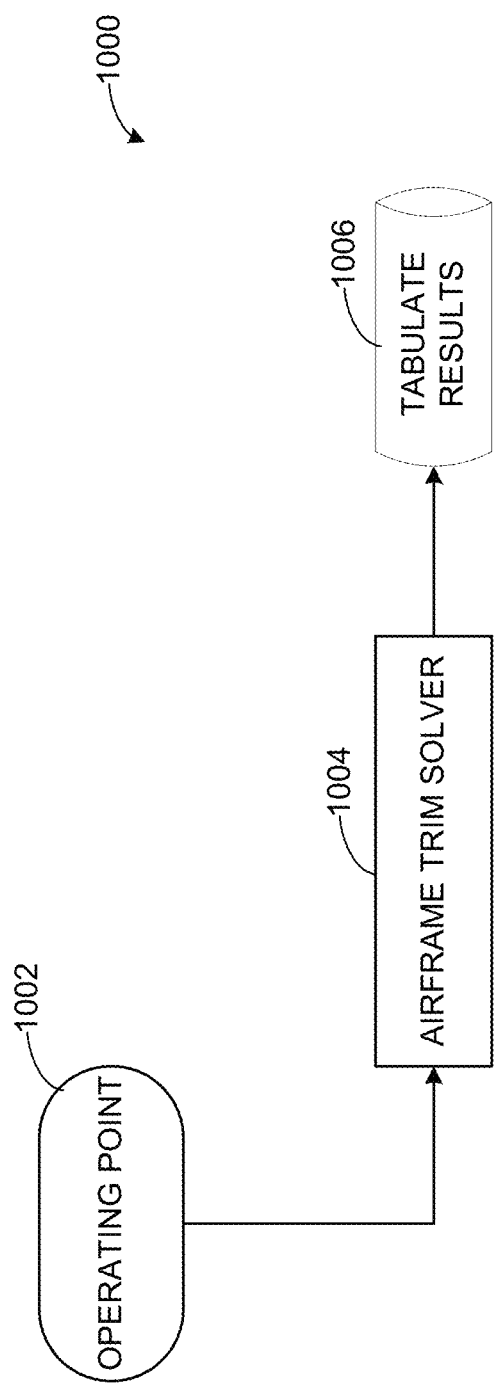
FIGS. 10-12 illustrate example computational processes to leverage the models and other available information to generate aircraft/flight control parameters.
Figure 11:
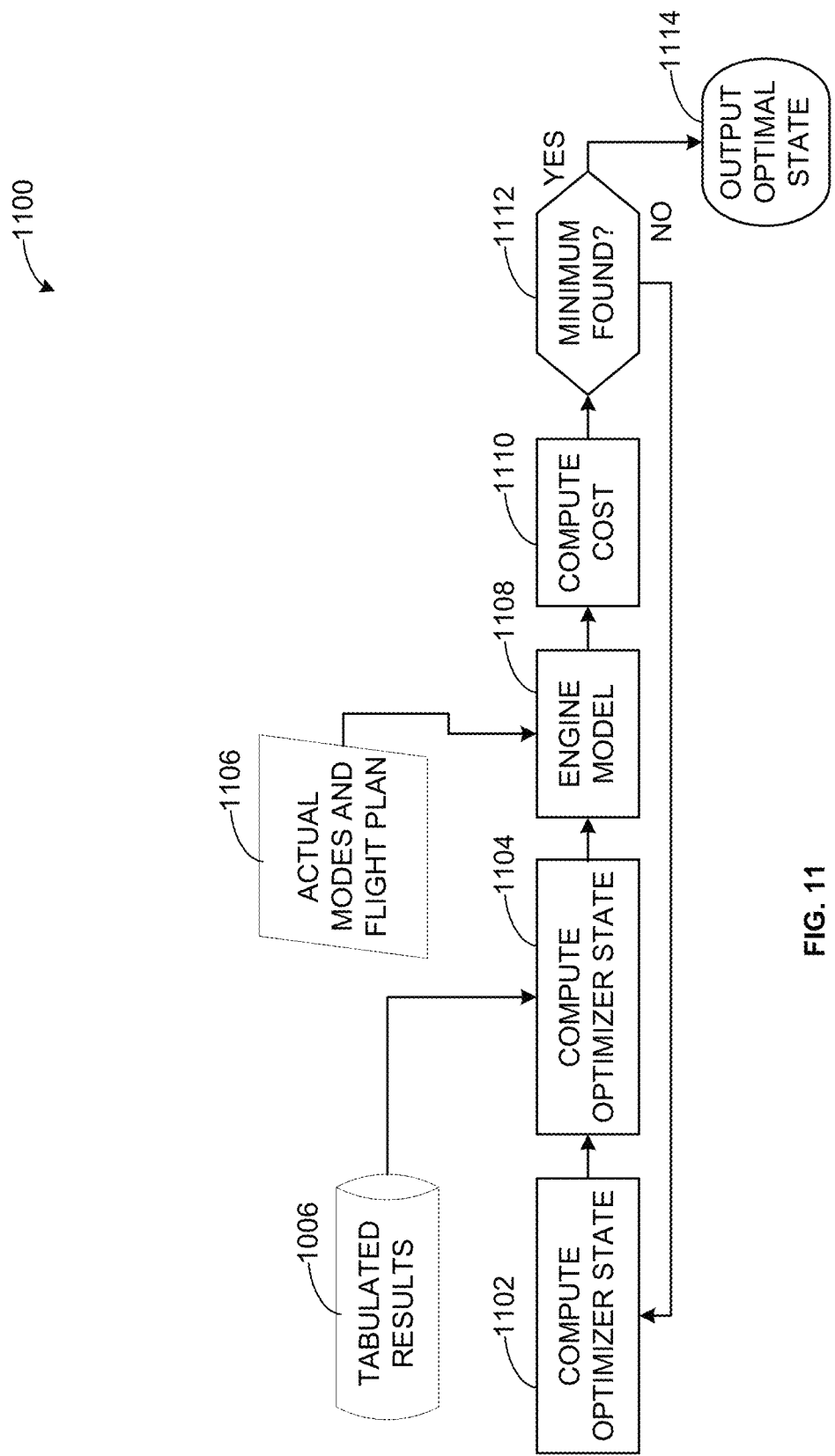
Figure 12:
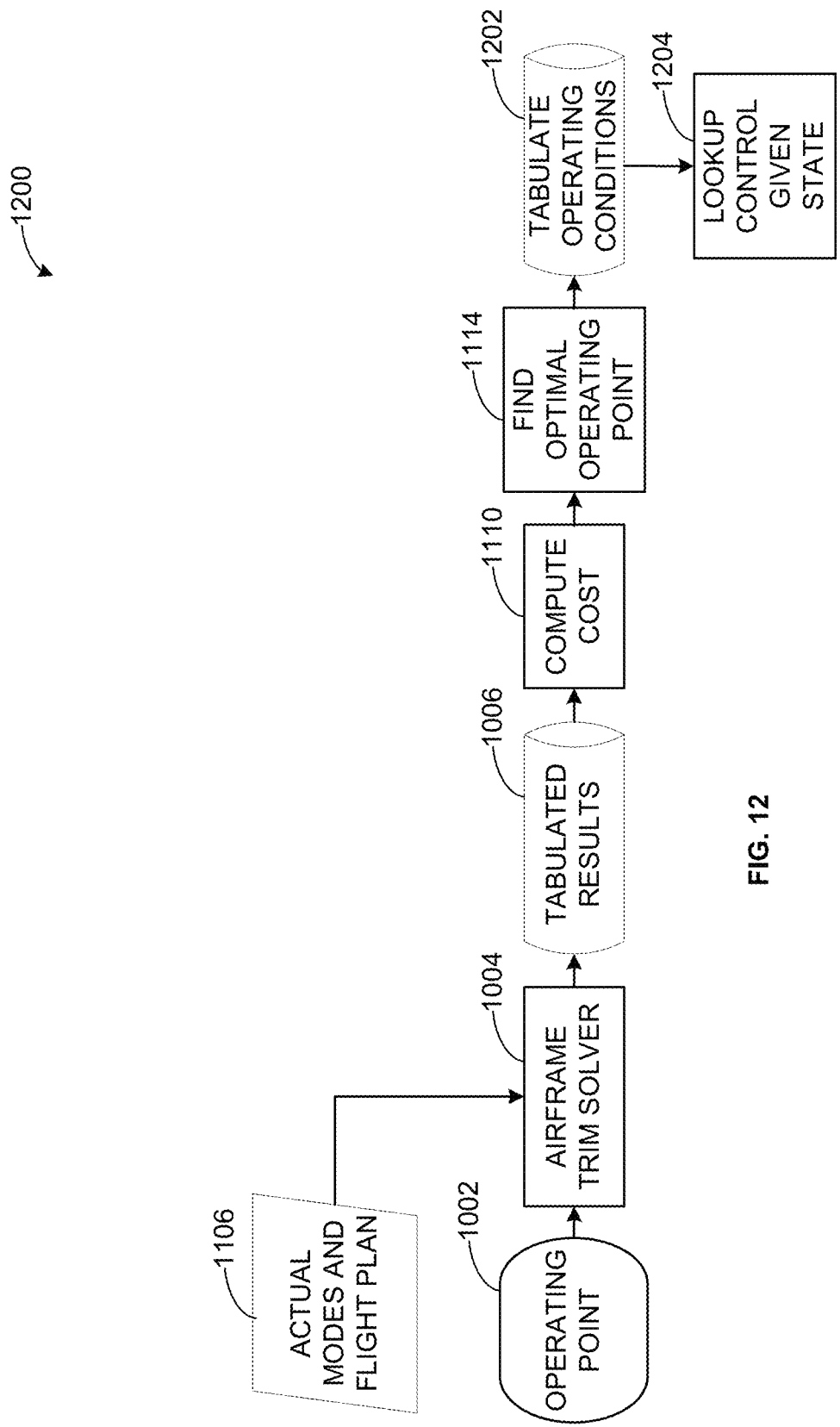
Figure 13:
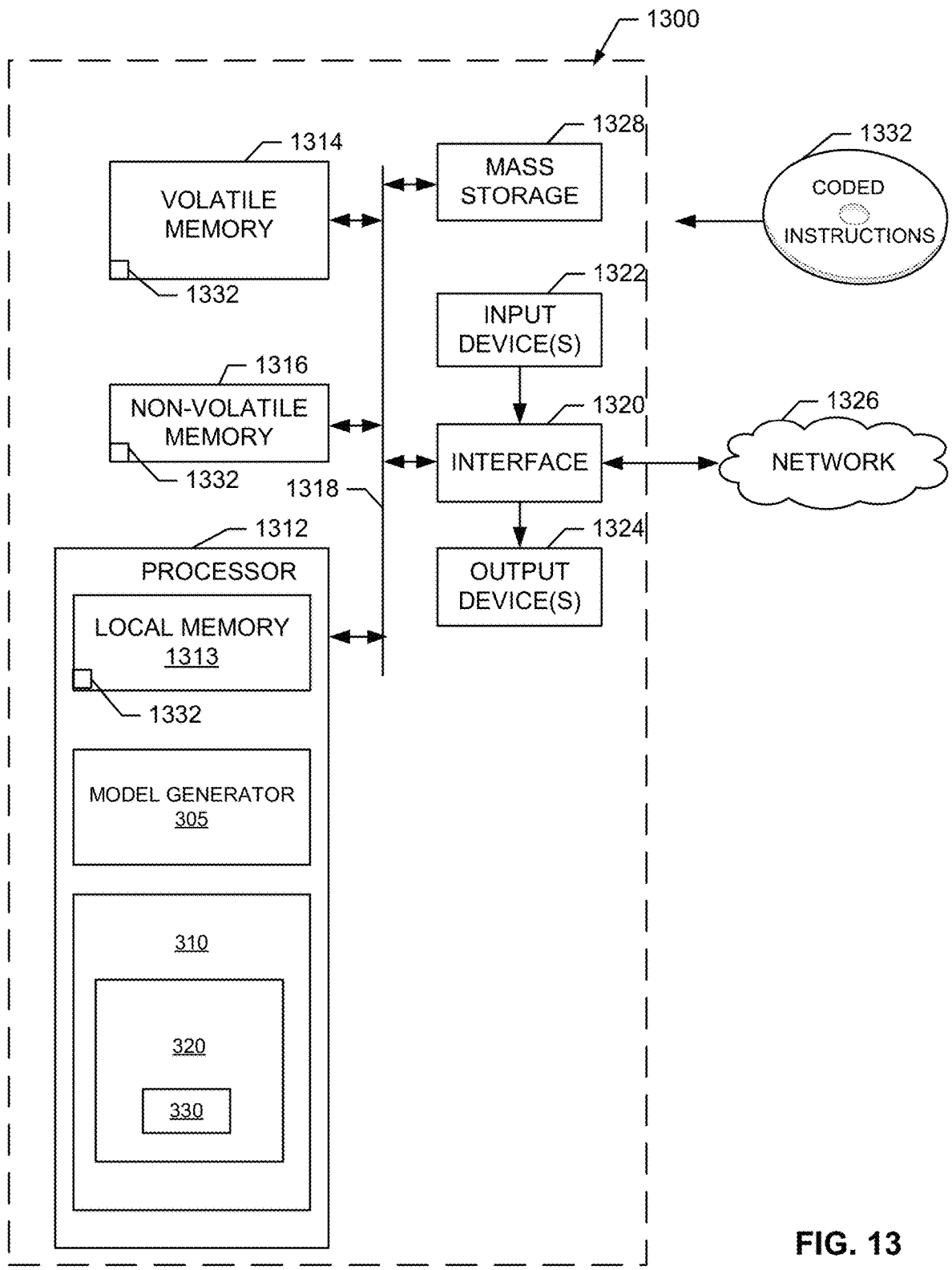
FIG. 13 is a block diagram of an example processing platform structured to execute machine-readable instructions to implement the methods of FIGS. 6-12 and/or the example flight management decision support apparatus of FIGS. 1-5.

FIG. 10 is a block diagram of an example processor platform 1000 capable of executing instructions to implement the methods of FIGS. 6-9 and the example system 100 of FIGS. 1-5. The processor platform 1000 can be, for example, an electronic control unit (ECU), an electronic engine control (EEC) unit, a full-authority digital engine control (FADEC) unit, other flight management system, a server, a personal computer, or any other type of computing device or network of computing devices.

The processor platform 1000 of the illustrated example includes a processor 1012. The processor 1012 of the illustrated example is hardware. For example, the processor 1012 can be implemented by one or more integrated circuits, logic circuits, microprocessors, or controllers from any desired family or manufacturer.

The processor 1012 of the illustrated example includes a local memory 1013 (e.g., a cache). The processor 1012 of the illustrated example executes the instructions to implement the example FMS 110, parameter selector 120, processor 202, memory 204, etc., and/or, more generally, the example decision support system 100 of FIGS. 1-5. The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 can be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip, or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, magnetic media, solid-state drives, compact disk drives, Blu-ray disk drives, RAID systems, and digital versatile disk (DVD) drives. The example mass storage 1028 implements the example database 370.

Coded instructions 1032 to implement the methods represented by the flowcharts of FIGS. 6-9 may be stored in the mass storage device 1028, in the volatile memory 1014, in the non-volatile memory 1016, and/or on a removable tangible computer-readable storage medium such as a CD or DVD.

From the foregoing, it will be appreciated that the above disclosed methods, apparatus, and articles of manufacture implement prognostic monitoring, modeling, and configuration of a turbine engine (and associated systems). By implementing monitoring and modeling at an engine load level, actionable information is determined to generate flight control parameters, flight path information, flight cost, etc. Reaction to conditions can be reduced and proactive responses to conditions encountered can be realized. The above disclosed methods, apparatus, and articles of manufacture can also eliminate or reduce modeling error by generating a lower-level engine load model 330 to supplement the higher-level engine model 320 and/or overall aircraft/engine system model 310. Although the figures and examples described herein sometimes refer to on-board (e.g., real-time systems on the turbine engine and/or aircraft), or off-board systems (e.g., ground-based systems), the above disclosed methods, apparatus, and articles of manufacture apply to both on-board and off-board systems.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system for modeling loads of at least one engine of an aircraft during a flight, the system comprising:
   a processor and a memory, the processor including:
   a model generator configured to generate an aircraft model (i) based upon received input data associated with the flight, (ii) to predict loads of the at least one engine and to control the aircraft during the flight based upon the predicted loads; and
   an engine model (i) within the aircraft model, (ii) representative of the at least one engine, and (iii) including one or more engine load models for predicting utilization of subsystems of the at least one engine;
   wherein the model generator generates the aircraft model responsive to a relational framework, the relational framework organizing portions of the received input data relevant to the aircraft model and configures the aircraft model according to relevant portions of the received input data; and
   wherein the one or more engine load models are dynamically adjustable during the flight.

2. The system of claim 1, wherein the engine model is a function of the one or more engine load models further comprising simulation of an engine subsystem utilization for the flight based upon load information;
   wherein the engine subsystem includes at least one of an electrical subsystem, a hydraulic subsystem, or a pneumatic subsystem.

3. The system of claim 2, wherein the one or more engine load models include at least one of an electrical load model, a hydraulic load model, or a pneumatic load model.

4. The system of claim 3, wherein the one or more engine load models provide information regarding how vehicle weight is to change, how much fuel is to be burned, and how environmental conditions are to impact engine operation for the flight.

5. The system of claim 4, wherein the engine model includes the one or more engine load models configured to predict load on the engine from the engine subsystem utilization to configure a flight management system to account for conditions encountered during the flight according to the engine model.

6. The system of claim 2, wherein the load information includes at least one from a group including flight information, weather information, passenger information, cargo information, and historical information.

7. The system of claim 1, wherein the one or more engine load models include at least one of flight information or weather information stored in a hierarchy data structure.

8. The system of claim 7, wherein the one or more engine load models further include composite values stored in the hierarchy data structure, the composite values generated from a combination of the flight information and the weather information.

9. A non-transitory computer-readable storage medium comprising instructions which, when executed, by a processor, cause the processor to:
   generate a model generator configured to generate an aircraft model (i) based upon received input data associated with a flight, (ii) to predict loads of at least one engine of an aircraft and to control the aircraft during the flight based upon the predicted loads; and
   provide an engine model (i) within the aircraft model, (ii) representative of the at least one engine, and (iii) including one or more engine load models for predicting utilization of subsystems of the at least one engine;
   wherein the model generator generates the aircraft model responsive to a relational framework, the relational framework organizing portions of the received input data relevant to the aircraft model and configures the aircraft model according to relevant portions of the received input data; and
   wherein the one or more engine load models are dynamically adjustable during the flight.

10. The non-transitory computer-readable storage medium of claim 9, wherein the engine model is a function of the one or more engine load models further comprising simulation of an engine subsystem utilization for the flight based upon load information;
    wherein the engine subsystem includes at least one of an electrical subsystem, a hydraulic subsystem, or a pneumatic subsystem.

11. The non-transitory computer-readable storage medium of claim 10, wherein the one or more engine load models include at least one of an electrical load model, a hydraulic load model, or a pneumatic load model.

12. The non-transitory computer-readable storage medium of claim 11, wherein the one or more engine load models provide information regarding how vehicle weight is to change, how much fuel is to be burned, and how environmental conditions are to impact engine operation for the flight.

13. The non-transitory computer-readable storage medium of claim 12, wherein the engine model including the one or more engine load models configured to predict load on the engine from the engine subsystem utilization to configure a flight management system to account for conditions encountered during the flight according to the engine model.

14. The non-transitory computer-readable storage medium of claim 10, wherein the load information includes at least one from a group including flight information, weather information, passenger information, cargo information, and historical information.

15. The non-transitory computer-readable storage medium of claim 9, wherein the one or more engine load models include flight information and weather information stored in a hierarchy data structure.

16. The non-transitory computer-readable storage medium of claim 15, wherein the one or more engine load models further include composite values stored in the hierarchy data structure, the composite values generated from a combination of the flight information and weather information.

17. A method for modelling loads of at least one engine of an aircraft during a flight, the method comprising:
    generating, via a processor, a model generator configured to generate an aircraft model (i) based upon received input data associated with the flight, (ii) to predict loads of the at least one engine and to control the aircraft during the flight based upon the predicted loads; and
    providing, via the processor, an engine model (i) within the aircraft model, (ii) representative of the at least one engine, and (iii) including one or more engine load models for predicting utilization of subsystems of the at least one engine;
    wherein the model generator generates the aircraft model responsive to a relational framework, the relational framework organizing portions of the received input data relevant to the aircraft model and configures the aircraft model according to relevant portions of the received input data; and
    wherein the one or more engine load models are dynamically adjustable during the flight.

18. The method of claim 17, wherein the engine model is a function of one or more engine load models further comprising simulation of an engine subsystem utilization for the flight based upon load information,
    wherein the engine subsystem includes at least one of an electrical subsystem, a hydraulic subsystem, or a pneumatic subsystem, and
    wherein the one or more engine load models include model includes at least one of an electrical load model, a hydraulic load model, or a pneumatic load model.

19. The method of claim 18, wherein the one or more engine load models provide information regarding how vehicle weight is to change, how much fuel is to be burned, and how environmental conditions are to impact engine operation for the flight.

20. The method of claim 19, further comprising providing the engine model including the one or more engine load models to predict load on the engine from the engine subsystem utilization to configure a flight management system to account for conditions encountered during the flight according to the engine model.

21. The method of claim 18, wherein the load information includes at least one from a group including flight information, weather information, passenger information, cargo information, and historical information.

22. The method of claim 17, wherein the one or more engine load models include flight information and weather information stored in a hierarchy data structure as modeled values.

23. The method of claim 22, wherein the one or more engine load models further include composite modeled values stored in the hierarchy data structure, the composite modeled values generated from a combination of the flight information and weather information.

* * * * *